United States Patent
Bryan

(10) Patent No.: US 10,984,127 B2
(45) Date of Patent: Apr. 20, 2021

(54) CONTENT LEAKAGE PROTECTION

(71) Applicant: Sophos Limited, Abingdon (GB)

(72) Inventor: John Bryan, Abingdon (GB)

(73) Assignee: Sophos Limited, Abingdon (GB)

( * ) Notice: Subject to any disclaimer, the term of this patent is extended or adjusted under 35 U.S.C. 154(b) by 174 days.

(21) Appl. No.: 15/635,968

(22) Filed: Jun. 28, 2017

(65) Prior Publication Data

US 2018/0004975 A1 Jan. 4, 2018

(30) Foreign Application Priority Data

Jun. 29, 2016 (GB) ..................................... 1611289

(51) Int. Cl.
*G06F 21/62* (2013.01)

(52) U.S. Cl.
CPC ...... *G06F 21/6245* (2013.01); *G06F 21/6254* (2013.01)

(58) Field of Classification Search
CPC .......................... G06F 21/6245; G06F 21/6254
See application file for complete search history.

(56) References Cited

U.S. PATENT DOCUMENTS

| | | | | |
|---|---|---|---|---|
| 9,215,207 | B2* | 12/2015 | Larcombe | H04L 63/30 |
| 2004/0128552 | A1* | 7/2004 | Toomey | G06F 21/57 |
| | | | | 726/22 |
| 2006/0005017 | A1 | 1/2006 | Black et al. | |
| 2006/0075228 | A1 | 4/2006 | Black et al. | |
| 2010/0332484 | A1* | 12/2010 | Saito | G06F 21/6254 |
| | | | | 707/757 |
| 2013/0024407 | A1* | 1/2013 | Thompson | G06F 16/353 |
| | | | | 706/12 |
| 2013/0262080 | A1* | 10/2013 | Marciano | G06F 40/47 |
| | | | | 704/3 |
| 2015/0089578 | A1* | 3/2015 | Schofield | H04L 63/123 |
| | | | | 726/1 |
| 2017/0185799 | A1* | 6/2017 | Zheng | G06F 16/9535 |

OTHER PUBLICATIONS

IPO, "UK Application No. 1611289.8 Combined Search and Examination Report dated Dec. 7, 2016", 6 pages.
IPO, "UK Application No. 1611289.8 Examination Report dated Jul. 18, 2019", 5 pages.
UKIPO, "UK Application No. 1611289.8 Combined Search and Examination Report dated May 19, 2020", 6 pages.

* cited by examiner

*Primary Examiner* — Shin-Hon (Eric) Chen
*Assistant Examiner* — Jessica J South
(74) *Attorney, Agent, or Firm* — Strategic Patents, P.C.

(57) ABSTRACT

Methods and systems for identifying content of interest. Accessed textual information is processed by at least one of character unification, phrase unification, and concept unification. A configured processor executes at least one predefined rule to determine whether the unified content includes certain types of information. Unified content that matches may be subject to further action such as alerts, encryption, logging, etc.

19 Claims, 6 Drawing Sheets

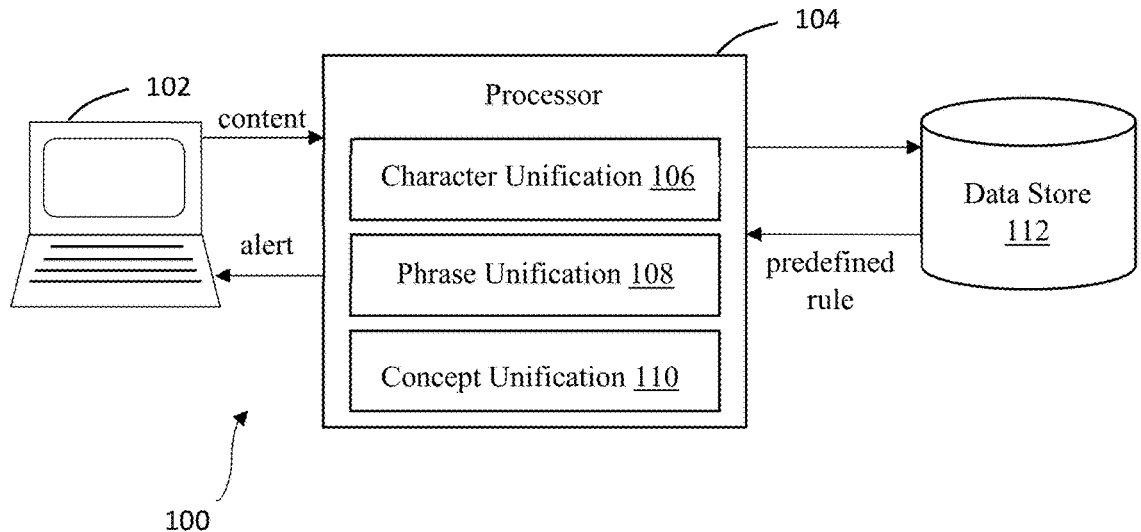

FIG. 1

| Script | Meaning | Unified |
|---|---|---|
| بَيْت bayt | House | 馆 |
| بُيُوت buyūt | Houses | (shop, house, embassy, establishment, accommodation for guests, gloriette) |

FIG. 2

| Exemplary Phrases | Token Value |
|---|---|
| ["fax", "telephone", "tel", "mobile"] | TELEPHONE_TERM |
| ["address", "contact details", "post to"] | ADDRESS_TERM |
| ["in confidence", "do not disclose"] | CONFIDENTIAL_TERM |
| ["top secret", "strictly confidential"] | SECRET_TERM |
| ["credit card", "bank account", "sort code"] | BANKING_TERM |
| ["driving license", "National Insurance", "NHS patient No."] | ID_TERM |

FIG. 3

```
"(?i)\b(?:(?:Tel(?:ephone)?|Phone|Tél(?:éphone)?|Teléfono|Tfno|móvil|Mob(?:ile)?|Porta
ble|Cell|Fax|work|office|Bureau|Travail|Oficina|Trabajo|home|Domicile|Casa|Particular|
domicilio|voice(?:[- ]?mail)?|Boîte vocale|buzón de voz|day(?:[-
]?time)?|Jour(?:née)?|eve(?:ning)?|Soir(?:ée)?)\b\D{1,50}|[tmfcwho]\W{0,10})0[-
\.]?[2-9]\d{1,2}(?:[- \.]?\d){6,10}(?!\d)"
```
— 400

FIG. 4A

```
"(?i)\b(?:TELEPHONE_TERM\b\D{1,50}|[tmfcwho]\W{0,10})0[- \.]?[2-9]\d{1,2}(?:[-
\.]?\d){6,10}(?!\d)"
```
— 402

FIG. 4B

```
<replace
value="(?i)\b(?:(?:Tel(?:ephone)?|Phone|Tél(?:éphone)?|Teléfono|Tfno|móvil|Mob(?:ile)?
|Portable|Cell|Fax|work|office|Bureau|Travail|Oficina|Trabajo|home|Domicile|Casa|Parti
cular|domicilio|voice(?:[- ]?mail)?|Boîte vocale|buzón de voz|day(?:[-
]?time)?|Jour(?:née)?|eve(?:ning)?|Soir(?:ée)?)\b\D{1,50}|(?<replace
>0[- \.]?[2-9]\d{1,2}(?:[- \.]?\d){6,10}(?!\d)" replacement="TEL_VALUE" />
```
— 500

FIG. 5

```
"BANK_VALUE NEAR (TEL_VALUE OR ADDRESS_VALUE OR PERSONAL_ID_VALUE)"
```
— 600

FIG. 6

| Script meaning "Listen" | | HAN Unified | 800 |
|---|---|---|---|
| Traditional Chinese | 聽 | 听 (Listen) | |
| Simplified Chinese | 听 | | |
| Japanese | 聴 | | |

FIG. 8

| Morpheme | KeyWord | 900 |
|---|---|---|
| telephone | TELEPHONE | |
| phone | | |
| teléfono | | |
| 电话 | | |
| credit card | BANK_ACCOUNT | |
| debit cards | | |
| bank card | | |
| tarjeta bancaria | | |

FIG. 9

CONTENT LEAKAGE PROTECTION

CROSS-REFERENCE TO RELATED APPLICATIONS

This application claims priority to United Kingdom Pat. App. No. 1611289.8 filed on Jun. 29, 2016, which is incorporated herein by reference in its entirety.

TECHNICAL FIELD

The invention relates generally to methods and systems for content security, and more specifically to the systems and methods for identifying content of interest.

BACKGROUND

Documents and other types of information are commonly communicated through electronic messages (e.g., email, SMS, MMS) or the like. Often times, however, these documents include information that is sensitive or otherwise considered private. Accordingly, the sender (along with other parties) may not want certain information to be shared. Furthermore, there may be legal implications in sharing certain information or otherwise not keeping certain information private.

For example, a sender may want to email certain documents to a recipient. However, and unbeknownst to the sender, the documents may include information that is considered private (e.g., telephone numbers, addresses, bank account numbers, network identifiers, financial information, etc.). It therefore may be helpful to know whether documents exiting a network or data store contain potentially private information prior to transmission.

Existing techniques for data search and/or extraction include text-based searches. These techniques only match a document if a specific phrase is present in the document. These existing techniques are typically limited to a single language or require translations prior to searching foreign language documents.

Accordingly, there is a need for systems and methods for identifying content of interest that overcome the above-described disadvantages.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect, embodiments relate to a method for identifying content of interest. The method includes accessing, through an interface to a programmable device, a text for analysis; applying, using a configured processor, at least one unification process to the accessed text to create a processed text, the at least one unification process selected from the group consisting of character unification, phrase unification, and concept unification; comparing, using the configured processor, the processed text to at least one predefined rule to identify content of interest; and issuing, using the configured processor, an alert indicating that content of interest has been identified in the processed text.

In one embodiment, character unification replaces any of a set of similar characters with a single character. In one embodiment, the similar characters are logograms or phonograms. In one embodiment, the single character is selected from the set of similar characters.

In one embodiment, phrase unification replaces any of a set of similar phrases with a token.

In one embodiment, concept unification replaces any of a set of values with a token.

In one embodiment, the at least one predefined rule includes at least one token.

In one embodiment, the at least one predefined rule includes at least one text pattern matching command sequence, for example, a regular expression.

In one embodiment, the method further includes preventing the transmission of the accessed text beyond the programmable device.

In one embodiment, the method further includes preventing one or more of: transmission, copying, reading, displaying, rendering, or printing of the accessed text.

In one embodiment, the processor is further configured to make a record indicating that content of interest has been identified in the processed text, for example, in addition to or instead of issuing the alert.

In another aspect, embodiments relate to a system for identifying content of interest. The system includes an interface to a programmable device configured to access a text for analysis; a processor in communication with the interface, the processor configured to apply at least one unification process selected from the group consisting of character unification, phrase unification, and concept unification; compare the processed text to at least one predefined rule to identify content of interest; and issue an alert indicating that content of interest has been identified in the processed text; and a data store in communication with the processor, the data store containing the at least one predefined rule.

In one embodiment, character unification replaces any of a set of similar characters with a single character. In one embodiment, the similar characters are logograms or phonograms. In one embodiment, the single character is selected from the set of similar characters.

In one embodiment, phrase unification replaces any of a set of similar phrases with a token.

In one embodiment, concept unification replaces any of a set of values with a token.

In one embodiment, the at least one predefined rule includes at least one token.

In one embodiment, the at least one predefined rule includes at least one text pattern matching command sequence, for example, a regular expression.

In one embodiment, the processor is further configured to prevent the transmission of the accessed text beyond the programmable device.

In one embodiment, the processor is further configured to make a record indicating that content of interest has been identified in the processed text, for example, in addition to or instead of issuing the alert.

In one embodiment, the processor is further configured to prevent one or more of: transmission, copying, reading, displaying, rendering, or printing of the accessed text.

In yet another aspect, embodiments relate to a computer readable medium containing computer-executable instructions for performing a method for identifying content of interest. The medium includes computer-executable instructions for accessing, through an interface to a programmable device, a text for analysis; computer-executable instructions for applying, using a configured processor, at least one unification process to the accessed text to create a processed text, the at least one unification process selected from the group consisting of character unification, phrase unification, and concept unification; computer-executable instructions for comparing, using the configured processor, the processed text to at least one predefined rule to identify content of interest, the at least one predefined rule including at least one of a token and a text pattern matching command sequence, such as a regular expression; computer-executable instructions for issuing, using the configured processor, an alert or making a record indicating that content of interest has been identified in the processed text; and computer-executable instructions for preventing the transmission of the accessed text beyond the programmable device.

In one embodiment, the computer-readable computer-executable instructions for preventing the transmission of the accessed text comprise computer-executable instructions for transmitting a directive to the programmable device, the programmable device preventing one or more of: transmission, copying, reading, display, rendering, or printing of the accessed text upon receipt of the directive.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following figures in which:

FIG. 1 illustrates the components of a system for identifying content of interest in accordance with one embodiment;

FIG. 2 depicts a table illustrating character unification in accordance with one embodiment;

FIG. 3 depicts a table illustrating phrase unification in accordance with one embodiment;

FIGS. 4A and 4B depicts an exemplary search expression prior to and after phrase unification;

FIG. 5 depicts a replacement expression in accordance with one embodiment;

FIG. 6 depicts a search expression in accordance with one embodiment;

FIG. 8 depicts a table showing the Han replacement step of FIG. 7 in accordance with one embodiment;

FIG. 9 depicts a table showing the Keyword replacement step of FIG. 7 in accordance with one embodiment;

In the drawings, like reference characters generally refer to corresponding parts throughout the different views. The drawings are not necessarily to scale, emphasis instead being placed on the principles and concepts of operation.

DETAILED DESCRIPTION

Figure 7:
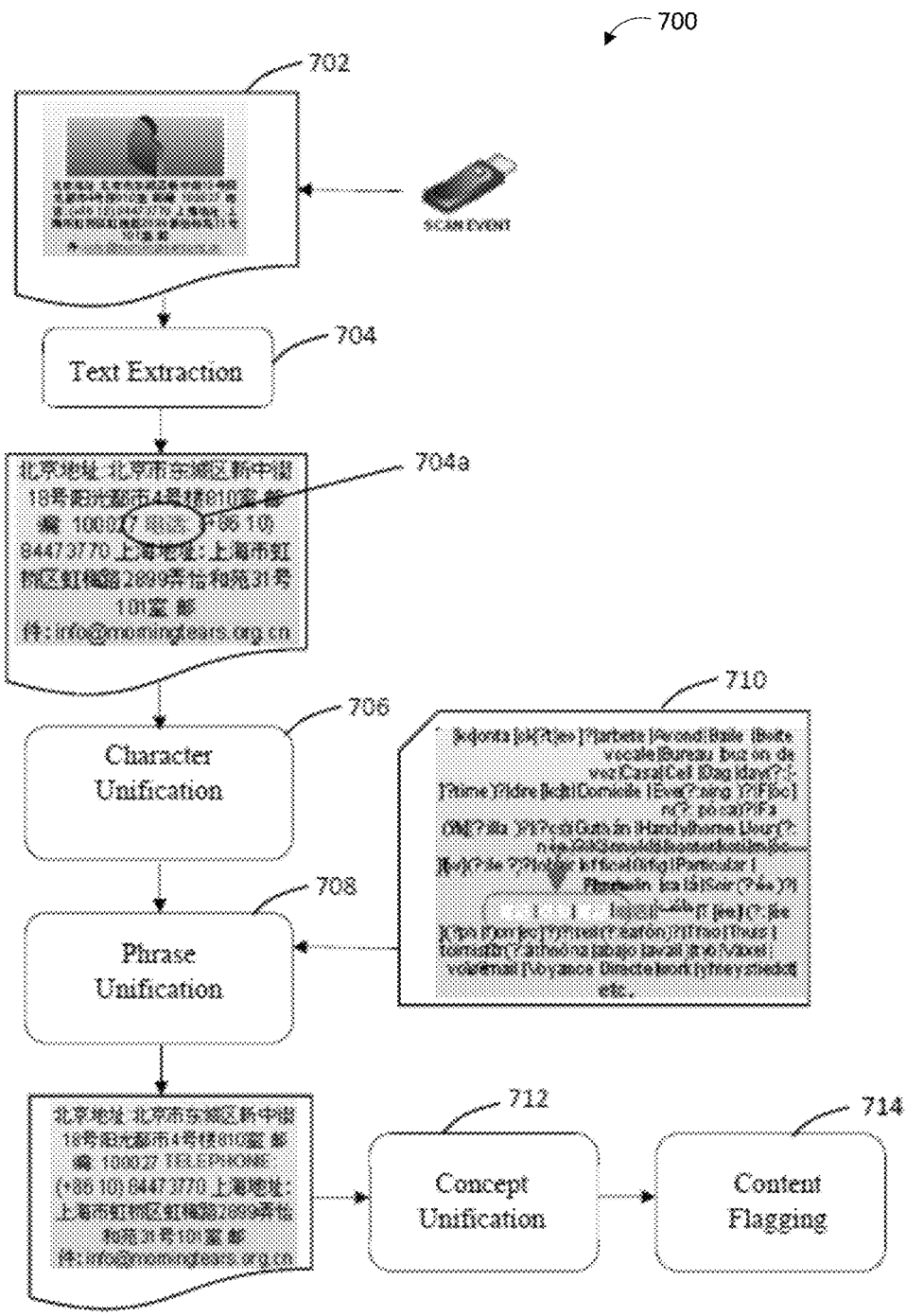
FIG. 7 depicts a flowchart of a method of identifying content in accordance with one embodiment.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment," "some embodiments," or to "an embodiment" means that a particular feature, structure, or characteristic described in connection with the embodiments is included in at least one embodiment of the invention. The appearance of these phrases (e.g., "in one embodiment") in various places in the specification are not necessarily all referring to the same embodiment or embodiments.

Some portions of the description that follow are presented in terms of symbolic representations of operations on non-transient signals stored within a computer memory. These descriptions and representations are the means used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. Various general purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The word "including" and the like in the specification should be understood to be non-limiting, as in "including without limitation."

In the context of the present application, a logogram or a logograph may be referred to as a grapheme, which represents a word, or a morpheme, which represents a minimal (e.g., small or the smallest) meaningful unit of language.

In the context of the present application, the term content controlled list (CCL) may refer to a set of user-specified items that are to be searched for in content. These items may include telephone numbers, postal addresses, bank details, national identification numbers (e.g., social security numbers), "confidential" document markers, any of the foregoing in proximity to certain specified items of interest (e.g., "bank details near . . . ", "credit card information near. . .", "national identification numbers near . . . "), or any combination thereof. CCLs can be user-defined and customized and/or be predefined and stored in a library, which may be stored, for example, in a data store in a formatted data file, in a database, or any suitable format.

While the following examples generally depict the unification of various characters, phrases, and concepts into a representative character, phrase, or concept in the same language as the original text, one of ordinary skill would recognize that it is well within the scope of the invention to replace various items in a first language with a unified item in a second language. For example, replacing the Arabic characters for house and houses (i.e., "بَيْت" and "بُيُوت") with the Han character for house ("馆") as part of the lexical unification process.

Features of the present invention may be used to prevent accidental (as well as intentional) transmission of certain data. As mentioned previously, an individual or a group may want to transmit certain content via electronic means. This content, however, may have certain information that is considered private (e.g., confidential, personal, secret) and it may be desired by the owner or administrator of the data that the information should not be sent or otherwise shared. This private information may include but is not limited to information such as personally identifiable information (PII), telephone numbers, postal addresses, medical information (e.g., to ensure compliance with the Health Insurance Portability and Accountability Act), financial information (e.g., bank account numbers), network information and information related to payment card industry data security (PCI DSS).

It would therefore be helpful to know whether the content includes this type of information prior to transmission, storage, or rendering in any manner. If the content contains this type of information, the content may be blocked from being sent, a message may be communicated to a user informing them that the content includes certain types of controlled information, the content may be automatically encrypted, may be recorded for auditing or further evaluation, the type of information may be recorded, etc.

Existing search techniques (such as text search engines) may be, for example, used to search for a specific telephone number rather than searching for anything that might be a telephone number. Additionally, most textual searching is limited to a single language or a specific subject. Therefore, it is difficult for these techniques to be scaled to address different languages.

Features of the present invention may therefore unify similar words, phrases, symbols, concepts, values, or the like into a single representation. The unified content may then be searched to determine if it includes certain types of controlled information. For example, a unified document may be searched to determine if it includes that anything that may be a telephone number, rather than being searched for specific telephone number(s).

FIG. 1 illustrates components of a system 100 for identifying content of interest in accordance with one embodiment. The user interface 102 is illustrated as being implemented as a laptop. However, the user interface 102 may be implemented as other types of programmable devices such as, but not limited to, PCs, tablets, smartphones, or the like.

The processor 104 may be any type of computer capable of executing one or more of the character unification module 106, the phrase unification module 108, and the concept unification module 110. The processor 104 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 104 may be configured as part of the user interface 102 (e.g., a laptop) or may be located at another location.

The character unification module 106 may be configured to transform one or more similar characters into a single representative character that can be searched. This plurality of characters may include letters, logograms, phonograms, or the like. In some embodiments, these characters may come from Han-based languages, which are languages derived from and including Chinese. For example, the similar characters may refer to different tenses of the same phrase as well as plurals/singulars of the same phrase (e.g., one character may mean "credit card" while another character means "credit cards").

As another example, various languages may augment base characters (e.g., "e") with various pronunciation marks, such as accents ("é"), umlauts ("ë"), circumflexes ("ê"), etc.

A character unification rule may replace variety of augmented characters with a single representative character (i.e., the base character, one particular augmented character, etc.).

As yet another example, various character coding schemes (ASCII, UNICODE, etc.) may have different codes representing different characters that appear similar or identical to a viewer. For example, many coding schemes include hyphens, ("-"), en-dashes (i.e., "—"), and em-dashes (i.e., "—"). Instead of coding different rules to flag digital content of interest containing various combinations of these characters, the character unification module 106 can replace all of these hyphen variants with, e.g., a hyphen, and a single rule with hyphens may be used.

FIG. 2, for example, illustrates an example of character unification. Table 200 identifies two different characters, their phonetic pronunciations, their similar meanings, and then a unified character that may be used to replace those two different characters. The unified character may itself be one of the plurality of similar characters.

The phrase unification module 108 may convert a phrase or phrases into a token that can be searched. The phrase unification module 108 may, for example, replace phrases with lexical translation expressions, which may then be searched for in the unified content.

For example, FIG. 3 depicts a table 300 showing exemplary phrases that may be unified by replacing them with a token value. This list may, of course, be customized or extended as desired.

Numerous advantages are realized by unifying various similar phrases into token values. For example, the tokens can largely be written in English regardless of the original language of the phrases. This provides simplified multilingual coverage.

Additionally, phrase unification simplifies search expressions, makes them easier to maintain, and reduces data processing and computation requirements. For example, FIG. 4A depicts a search expression 400 prior to the implementation of phrase unification, and FIG. 4B depicts a simplified search expression 402 used in embodiments implementing phrase unification.

The concept unification module 110 may replace values based on context with a simple token phrase. For example, the concept unification module 110 may be configured to search a document for text and/or numbers that may be a telephone number.

Consider the text "Customer tel number: 0-312-123456; Customer bank account number: 0987654321." This type of text may occur several times within a document, potentially unbeknownst to a potential sharer of the document. The concept unification module 110 may execute a replacement expression over such a document. FIG. 5 depicts a concept unification expression 500 in accordance with one embodiment that replaces values that may appear to be a telephone number with the token "TEL_VALUE." Therefore, the foregoing text would be translated to "Customer tel number: TEL_VALUE; Customer bank account number: 0987654321."

Additionally or alternatively, a similar concept unification expression can be applied for content taking the form of bank account numbers. For example, the foregoing text may be transformed to "Customer tel number: TEL_VALUE; Customer bank account number: BANK_VALUE."

After unification, the document could easily be searched for anything that appears to be a telephone number and/or a bank account number. More complex search requests may be made as well. For example, the document may be searched for bank account details that are in proximity to personally identifiable information using the expression 600 of FIG. 6.

Accordingly, the character unification module 106, the phrase unification module 108, and the concept unification module 110 can individually or collectively process content to standardize the expression of certain kinds of information. Expressing these kinds of information in a standardized format enables simplified pattern matching, facilitating search, content protection, etc., and reducing the amount of effort required to identify all potential content of interest.

While the exemplary embodiment of FIG. 1 illustrates a single character unification module, a single phrase unification module, and a single concept unification module, one of ordinary skill would understand that these modules can be organized in a variety of ways in accord with the present invention. For example, each unitary "module" may in implementation be a plurality of individual modules. Character unification may include, e.g., a Han language unification module, a module for unifying one or more punctuation marks, another module for unifying one or more accented and unaccented characters, and so on.

In another example, the modules can be chained in a series configuration, such that, e.g., the output of character unification is the input to the phrase unification, and the output of phrase unification may in turn be the input to concept unification or another character unification module.

The modules may also be configured to operate in a parallel configuration, where each module operates independently on the content under review, performing, e.g., multiple kinds of character unification, phrase unification, and concept unification substantially simultaneously.

Some of these configurations may also use the output of later modules as input to earlier modules, permitting, e.g., character unification to be run on the output of a concept unification module, or the output of another character unification module.

Referring back to FIG. 1, the data store 112 may include at least one predefined rule for application to the unified content. This predefined rule may define a certain item (e.g., a telephone number or the like) to be matched in the unified content. If that certain item detected, an alert to that effect may be communicated to a user. An alert may be communicated via visual means, auditory means, haptic-based means, or any combination thereof. This alert may be accompanied with a reason for the alert, such as one or more rules that were triggered and, in some embodiments, give the user the option of overriding the alert. In still other embodiments, the unified content or the original content may be blocked, interdicted, or deleted. In other embodiments, the matching information may be encrypted, obfuscated, anonymized, replaced, or redacted before further transmission.

FIG. 7 depicts a flowchart of a method 700 of identifying content of interest in accordance with one embodiment. First, a raw document is obtained in step 702 from any of a variety of sources, for example, a scanning device, removable or fixed storage, network or cloud storage, an electronic message (such as e-mail, text message, instant message, etc.), a network upload or download, a print queue or buffer, a file system operation, a copy/paste buffer, etc. For example, the raw document may be obtained as part of a scheduled or on demand scan of one document, a collection of documents, or a data store. For example, the raw document may be obtained in connection with scanning and categorization during storage or initial document intake or creation. For example, the raw document may be obtained as part of a reading or loading process, or upon storage or copying. For example, the raw document may be obtained in connection with printing, viewing, or copying all or a part of the document. These are a few examples, and documents may be obtained from any of a variety of sources in different contexts and implementations.

Text from the document may be prepared and extracted in step 704 in preparation for one or more of character unification, phrase unification, and concept unification.

Step 704a illustrates the text extraction process. An extraction module or process determines if the document includes any characters or character combinations that can be replaced with a simplified representation. Each character extracted from the document is compared against one or more predefined rules to see if it can be replaced by another canonical character, simplifying later scans for sensitive digital content. In this example, 704a indicates that the word "telephone" in Chinese is present in the document.

Step 706 involves character unification, i.e., the replacement of previously identified characters and character combinations with a unifying character. For example, FIG. 8 depicts a table 800 showing various graphemes of the word "listen" in three Chinese-derived languages and the replacement Han character for each of these graphemes. This step may consist of character remapping using a lookup table of characters and replacement characters which may be hard-coded.

Step 708 involves phrase unification. Step 710 illustrates how one or more keywords are identified in a document for replacement with a single unifying token value or keyword. FIG. 9 depicts an exemplary table 900 of phrases as well as their replacement keyword. As illustrated, various words and phrases as well as equivalent abbreviations, plural forms, etc., may be replaced with a single value such as "TELEPHONE."

Referring back to FIG. 7, Step 712 involves concept unification to replace identifiable content (e.g., email addresses, phone numbers, bank account numbers, social security numbers, etc.) with a token such as:

"John.Doe@example.com"→"EMAIL_ADDR"
"http://www.example.com"→>"WEB_ADDR"

In some embodiments, the original value may be preserved to aid in later reporting and analysis, such as:

"John.Doe@example.com"→"EMAIL_ADDR (John.Doe@example.com)"
"http://www.example.com"→"WEB_ADDR(www.example.com)"

In the replacement, a particular character or combination of characters may be used to denote the token and/or the original value. For example, a relatively unique value may be used as the token. The original value may be denoted by parenthesis as shown above, and other characters and numbers may be used instead or in addition.

In some embodiments, a combination (e.g., a series) of characters may be used in the token, such as EMAIL12345678ADDR to distinguish from a possible use of the token characters in the document. In some implementations, the token appears twice, with the original information in between.

"John.Doe@example.com"→"EMAIL12-AFE453ADDRJohn.Doe@example.com EMAIL12AFE453ADDR"

In some implementations, one token is inserted before the original information and another token is inserted after the original information.

"John.Doe@example.com"→"EM12AFE453ADDR+ BEGINJohn.Doe@example.com EMAIL12AFE453ADDR+END"

In some embodiments, a different token is used for each instance, and the original information is stored separately, e.g., in a list of tokens, in a separate file, in a database, etc. so that the information may be recovered.

"John.Doe@example.com"→"EMADDR12AFE453"
"Jane.Doe@example.com"→"EMADDR12AFE454"

Step 714 involves the application of various rules to the unified content to identify content of interest for special processing. For example, a rule specifying a token such as "CREDIT_CARD_NUMBER" may cause unified content containing such a token to be automatically encrypted before further transmission.

Such rules may specify one or more of a character, a phrase, and a concept by themselves or in relation to each other. Each rule may also specify a variety of actions to be taken when a match is found, including but not limited to logging the match for later review, issuing an alert to one or more users, halting the operation involving the matching content, automatically encrypting the matching content, automatically encrypting the file, etc.

In some embodiments, the tokens are evaluated, and if one or more tokens indicates that the file should be encrypted, the tokens are removed such that the file is returned to its original state, and the file is encrypted.

Figure 10:
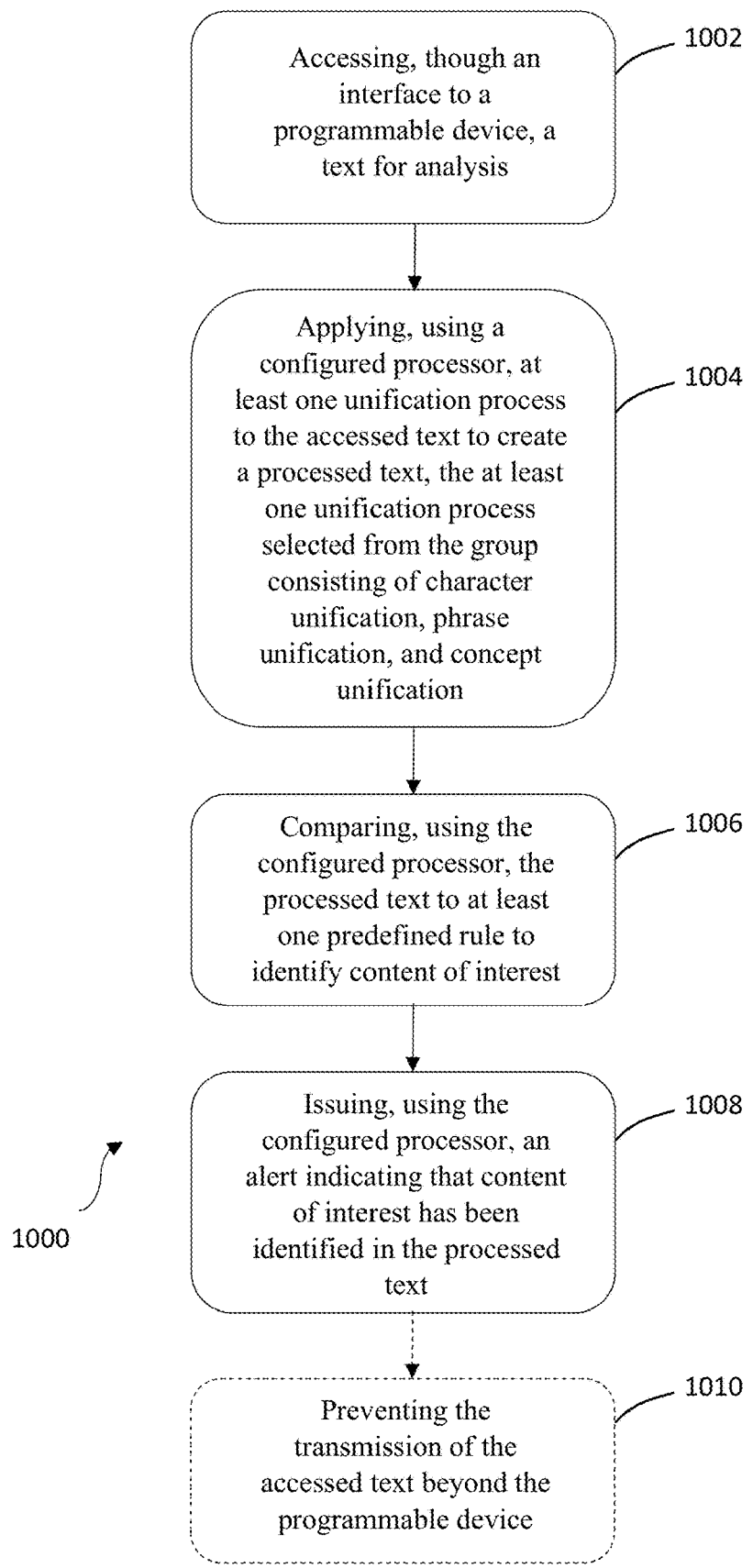
FIG. 10 depicts a method of identifying content in accordance with another embodiment.

FIG. 10 depicts a flowchart of a method 1000 for identifying content of interest in accordance with another embodiment. Step 1002 involves accessing, through an interface to a programmable device, a text for analysis. This device may be implemented as, for example, a PC, laptop, tablet, smartphone, or the like. The text may include any type of document containing textual information.

Step 1004 involves applying, using a configured processor, at least one unification process to the accessed text to create a processed text, the at least one unification process selected from the group consisting of character unification, phrase unification, and concept unification.

As mentioned previously, the character unification process may involve replacing any of a set of similar characters, such as logograms or phonograms, with a single character. This character unification process may be performed by the character unification module 106 of FIG. 1.

The phrase unification process may involve replacing any of a set of similar phrases with a token. This phrase unification process may be performed by the phrase unification module 108 of FIG. 1, and a list of exemplary phrases and their corresponding tokens are shown in table 300 of FIG. 3.

The concept unification process may involve replacing any of a set of values with a token. As mentioned previously, this step may involve replacing identifiable content with a context keyword. This step may be performed by the concept unification module 110 of FIG. 1.

Step 1006 involves comparing, using the configured processor, the processed text to at least one predefined rule to identify content of interest. This predefined rule may be defined in a list and used to search for one or more of a character, phrase, concept, or token by themselves or in relation to each other.

Step 1008 involves issuing, using the configured processor, an alert indicating that content of interest has been identified in the processed text. The alert itself may be visible to a user or "silent," i.e., concealed from one or more users and processed automatically by the content matching system or another computer. If a user is using a PC, for example, the alert may be communicated to the user via a pop-up window indicating that content of interest has been identified. The user may be presented with an option to remove the identified information and/or ignore the alert. These types of user-facing alerts may be communicated via any type of visual, audio, or haptic-based means.

In some embodiments, the alert may be the first of several steps taken in response to the identification of content of interest. For example, optional Step 1010 involves preventing the transmission of the content of interest. Other similar actions that may be taken as a result, in lieu or in addition to the issuing of alerts, include the logging of the event, the automatic encryption of the content of interest, a false progress indicator telling a user that the requested action has been taken when, in actuality, the action has been prevented, recording the event or the content for auditing or further investigation, and so on.

Figure 11:
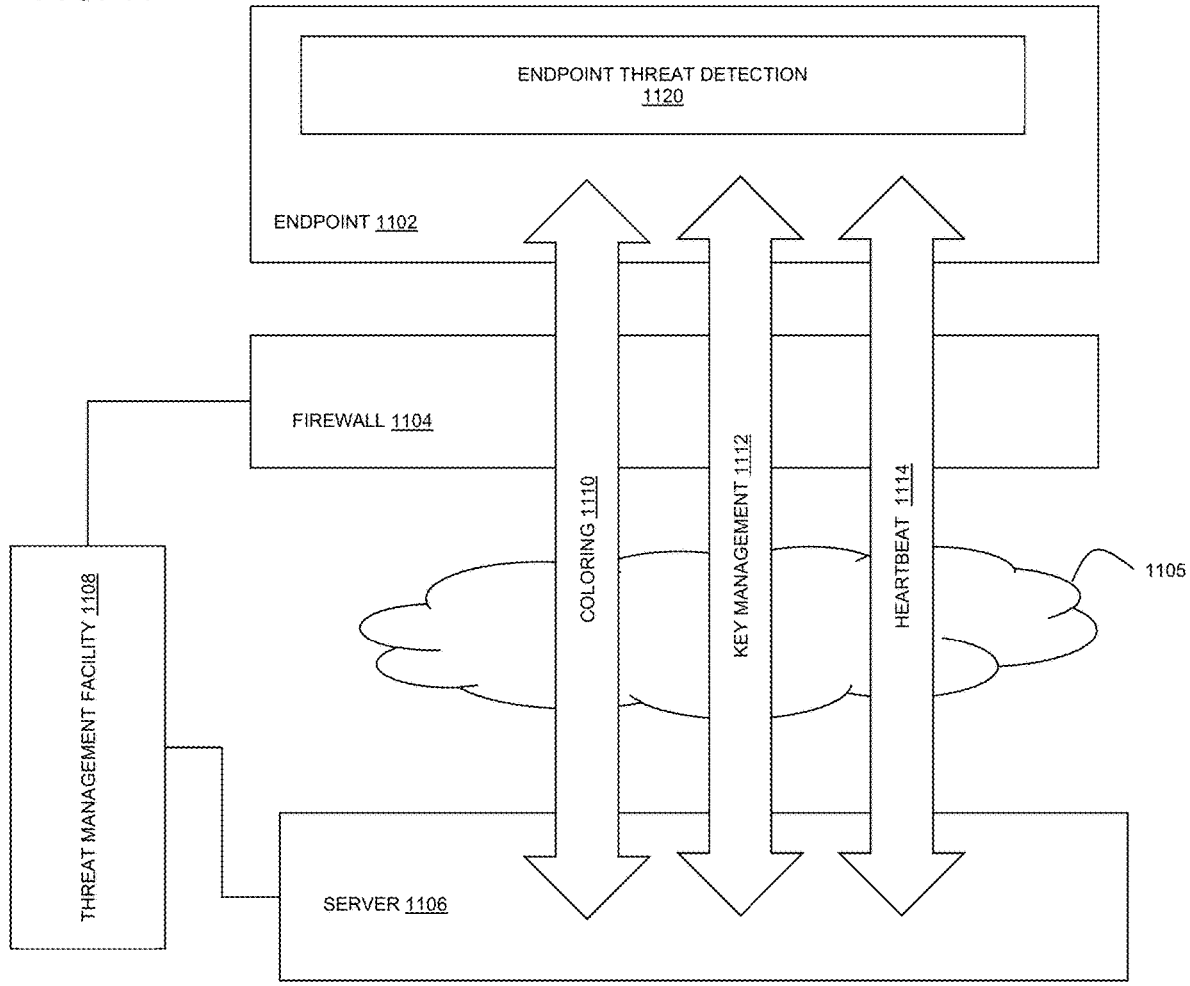
FIG. 11 illustrates a network which the systems and methods described may be implemented.

FIG. 11 illustrates a network which the systems and methods described may be implemented. In general, the system may include one or more endpoints 1102, one or more firewalls 1104, one or more servers 1106 and one or more threat management facilities 1108 coupled to one another directly or indirectly through a data network 305. Each of the elements depicted may, for example, be implemented on one or more devices. One, two, or more of these elements may be included in a particular implementation. These elements may be locally or remotely located from each other, across one or more of a LAN, a WAN, a cellular network, a wifi network, a bluetooth network, and the Internet. In a simple implementation, the endpoint 1102 and firewall 1104 are located proximate to each other, with the firewall 1104 protecting the endpoint 1102 from the network 1105. The threat management facility 1108 and the server 1106 may be located elsewhere, and communicate with the endpoint 1102 and the firewall 1104 over the network 1105. In various embodiments, aspects of the elements shown may be co-located or included in others. For example, the server 1106 may include the threat management facility 1108. For example, a firewall 1104 may include a threat management facility 1108 and a server 1106, and so on.

The techniques described here for identifying content of documents may be implemented for example, on one or more of: the endpoint 1102, the firewall 1104, the server 1106, or the threat management facility 1108. The techniques may be included with other scanning activity, such as part of a scan for malware, or for data loss prevention. A raw document may be obtained from any of a variety of sources on one or more devices, for example, in connection with scanning files or data in storage, in transit, upon a file system activity (e.g., read, write, or modify), a network activity (e.g., sending, receiving), a network protection activity, etc. Just as a few examples, a raw document may be obtained from a scanning device, removable or fixed storage, network or cloud storage, an electronic message (such as e-mail, text message, instant message, etc.), a network upload or download, a print queue or buffer, a file system operation, a copy/paste buffer, etc. For example, the raw document may be obtained as part of a scheduled or on-demand scan of one document, a collection of documents, or a data store. For example, the raw document may be obtained in connection with scanning and categorization during storage or initial document intake or creation. For example, the raw document may be obtained as part of a file reading or loading process, a file transmission or communication process, or as part of a storage or copying. For example, the raw document may be obtained in connection with printing, viewing, or copying all or a part of the document.

An endpoint 1102 is a device typically used by a user on a network. In some embodiments, the term endpoint 1102 may refer to a computer system that may source data, receive data, evaluate data, buffer data, or the like (such as a user's desktop computer as an endpoint computer), and may include a firewall 1104 or server 1106 as a data evaluation endpoint computer system, a laptop as a mobile endpoint computer, a personal digital assistant or tablet as a hand-held endpoint computer, a mobile phone as an endpoint computer, or the like. In embodiments, an endpoint 1102 may be a source or destination for data, including such components where the destination is characterized by an evaluation point for data, and where the data may be sent to a subsequent destination after evaluation.

In some embodiments, an endpoint computer threat detection facility 1120 is located on an endpoint 1102 to provide threat protection to a user. The endpoint threat detection facility 1120 may be an application loaded onto the computer platform or computer support component, where the application may accommodate the plurality of computer platforms and/or functional requirements of the component. For instance, an endpoint 1102 may be one of a variety of computer platforms, such as Windows, Macintosh, Linux, and the like, where the endpoint threat detection facility 1120 may be adapted to the specific platform on which it is employed. Additionally, components may have different functions to serve within networked computer-based infrastructure. For instance, computer support components provided as hubs and routers, servers 1106, firewalls 1104, and the like, may require unique security application software to protect their portion of the system infrastructure, while providing an element in an integrated threat management system that extends to incorporate computer resources under its protection.

The endpoint computer threat detection facility 1120 may serve as a security agent on the endpoint 1102 to provide a capability for recognizing indications of compromise, such as malware, or unexpected user behavior, or for data loss prevention. The endpoint computer threat detection facility 1120 may provide virus and malware protection, security and control over access to resources on the endpoint, encryption/decryption capability, data loss prevention, and so on.

An endpoint computer threat detection facility 1120 may protect an endpoint 1102 from threats by providing network security capabilities, which may include a hardware firewall, software firewall, or combination of these, for example, that may control network traffic to and from the endpoint 1120. The endpoint computer threat detection facility 1120 may permit or deny communications based on a security policy. The endpoint computer threat detection facility 1120 may be designed for use on and by endpoints, so that the protection is directed to the device on which it is installed. The endpoint computer threat detection facility 1120 may be able to control network traffic by providing prompts when any or suspicious connections may be attempted and adapting security policy accordingly. The endpoint computer threat detection facility 1120 may also provide some level of intrusion detection, which may allow the software to terminate or block connectivity where it suspects an intrusion is being attempted. The endpoint computer threat detection facility 1120 may scan files for threats such as malware, for example, and for data loss prevention. Other features that may be provided by the endpoint computer threat detection facility 1120 may include alerts about outgoing connection attempts, control of program access to networks, hiding the endpoint 1102 from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like.

Some threats may not come through communication over a network like the Internet, but may be from devices that are physically connected to a network element such as an endpoint 1102. The connection may be made from direct connection, such as through a USB port, or in physical proximity with a wireless connection, such as through a Bluetooth or wifi connection. These physical proximity threats may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. Techniques described may be implemented within an endpoint threat detection facility 1120 to scan data read and stored by the endpoint, whether over networks or through other communications mechanisms. The endpoint threat detection facility 1120 may scan a device prior to allowing data transfers, and may scan data transferred to or from a device and the endpoint 1120. These scans may include scans for data loss prevention.

A firewall 1104 may be a hardware or software device that may be configured to permit, deny, or proxy data through a computer network that has different levels of trust in its source of data. For instance, a local network may have a high level of trust, because the source of all data has been sourced from within the local network. An example of a low level of trust is the Internet, because the source of data may be unknown. A firewall 1104 may be a boundary between threat levels, and may control the flow of threats between networks. A firewall 1104 may include a variety of capabilities for scanning, testing, and controlling communication across networks, and may implement the techniques described. These scans may include scanning for data loss prevention.

One or more other systems may be distributed across these various components to support threat detection, such as a coloring system 1110, a key management system 1112 and a heartbeat system 1114, each of which may include software components executing on any of the foregoing system components, and each of which may communicate with the threat management facility 1108 and an endpoint threat detection agent 1120 executing on the endpoint 1102 to support improved threat detection and remediation. In various embodiments, different combinations of these systems 1110, 1112, 1114 may or may not be included, depending on the requirements of a given implementation.

Techniques described above may be implemented in an endpoint 1102, for example as part of an endpoint threat detection component 1120. The endpoint threat detection component 1120 may be configured to scan network traffic (e.g., web, email, other application traffic, etc.) and data stores available to the endpoint 1102 to identify content. Likewise, the firewall 1104 may include functionality to scan network traffic (e.g., web, email, other application traffic, etc.) and to provide other functionality to assure the security of the network.

The threat management facility 1108 may provide protection from compromise, such as computer-based malware, including viruses, spyware, adware, Trojans, intrusion, spam, policy abuse, uncontrolled access, data loss prevention, and the like. The threat management facility may provide protection to one or more enterprise facilities such as a corporate, commercial, educational, governmental, entity or the like, and the protected facility's computer network may be distributed amongst a plurality of facilities, and in a plurality of geographical locations. In embodiments, the threat management facility 1108 may be provided as a stand-alone solution. In other embodiments, the threat management facility 1108 may be integrated into a third-party product. An application programming interface (e.g. a source code interface) may be provided such that the threat management facility 1108 may be integrated. For instance, the threat management facility 1108 may be stand-alone in that it provides direct threat protection to an enterprise or computer resource, where protection is subscribed to directly 1108. Alternatively, the threat management facility 1108 may offer protection indirectly, through a third-party product, where an enterprise may subscribe to services through the third-party product, and threat protection to the enterprise may be provided by the threat management facility 1108 through the third-party product.

The threat management facility 1108 may include a policy management facility that may include a set of rules or policies for access and permissions for the firewall 1104 and the endpoint 1102, such as access permissions associated with the network, applications, external computer devices, and the like. The policy may be stored in a database, a text file, a combination of databases and text files, or the like. In an embodiment, a policy database may include a block list, a black list, an allowed list, a white list, or the like that may provide a list of external network locations/applications that may or may not be accessed by the client facility. The policy may include rules that may be interpreted with respect to network access requests to determine if a request should be allowed. The rules may provide a generic rule for the type of access that may be granted. The rules may be related to policies for access rights. The rules may be related to documents and content of documents that may transit a network or be stored in data storage, or be uploaded or downloaded. The policies may be set through access to the threat management facility 1108. The policies may be defined for application type, subset of application capabilities, organization hierarchy, computer facility type, user type, network location, time of day, connection type, or the like. Policies may be maintained by the threat management facility, in association with a third party, or the like.

The threat management facility 1108 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The coloring system 1110 may be used to label or 'color' objects for improved tracking and detection of potentially harmful activity. The coloring system 1110 may, for example, label files, executables, processes, network communications, data sources and so forth with any suitable technique. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 1110 as contemplated herein. In some embodiments, the rules described above may be used to scan and color one or more files, based on the information that is determined to be included in the one or more files using techniques described.

The key management system 1112 may support management of encryption keys for the endpoint 1102 in order to selectively permit or prevent access to content on the endpoint 1102 on a file-specific basis, a process-specific basis, an application-specific basis, a user-specific basis, or any other suitable basis in order to prevent data leakage, and in order to support more fine-grained and immediate control over access to content on the endpoint 1102 when a potential or actual security compromise is detected. Thus for example, if a particular process executing on the endpoint is compromised, or potentially compromised or otherwise under suspicion, keys to that process may be revoked in order to prevent, e.g., data leakage or other malicious activity. Likewise, if private content is detected to be transiting a network, keys may be revoked for the process, endpoint, user, etc., in order to prevent, e.g., data leakage or other malicious activity, or keys may be used to encrypt files or portions of files to prevent data loss.

The heartbeat system 1114 may be used to provide periodic or aperiodic information from the endpoint 1102 or other system components about system health, security, status, and so forth. A heartbeat may be encrypted or plaintext, or some combination of these, and may be communicated unidirectionally (e.g., from the endpoint 1108 to the threat management facility 1108) or bidirectionally (e.g., between the endpoint 1102 and the server 1106, or any other pair of system components) on any useful schedule. Information about information in documents used by the endpoint 1120 may be included in the heartbeat 1114. Likewise, alerts and other information described above, for example, communicated to administrators or stored in logs, may be included in the heartbeat 1114. Alerts and other information described above may be used to change a status indication or other information included in the heartbeat 1114. For example, the presence or absence of information in documents on the endpoint 1102 may be communicated as part of a health status.

In general, various monitoring and management systems may cooperate to provide improved threat detection and response. For example, the coloring system 1110 may be used to evaluate when a particular process is potentially opening inappropriate files, or whether files that are transiting the endpoint, as determined, for example, by the endpoint threat detection component 1120 or the firewall 1104 are indicative of compromise. Techniques described may be used to determine when files include certain information, for example, based on the tokens described above.

The cooperation may be secured using the heartbeat 1114, where an interrupted heartbeat from the heartbeat system 1114 may also be indicative of compromise. The key management system 1112 may then be deployed, for example, to revoke keys to the process, application, or the endpoint, so that no further files can be opened, deleted, transmitted or used otherwise. Likewise, the key management system 1112 may be used to encrypt files that are transiting the endpoint or the network. More generally, the cooperation of these systems enables a wide variety of reactive measures that can improve detection and remediation of potential threats to an endpoint, or prevention measures that can protect information in a network.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying content of interest, the method comprising:
   accessing, through an interface to a programmable device, a text in a first language for analysis;
   applying, using a configured processor, a plurality of unification processes chained in a series configuration to create a processed text, the plurality of unification processes including at least one character unification that replaces each of at least two distinct characters in the text with a unification character token in the processed text, at least one phrase unification that replaces each of at least two distinct phrases in the text with a single unification phrase token in the processed text, and at least one concept unification, wherein the at least one concept unification replaces a first portion of the text with a concept unification token based on a second portion of the text that is adjacent to the first portion;
   identifying a content of interest in the processed text by comparing, using the configured processor, the processed text including the concept unification token to at least one predefined rule that defines content of interest as a portion of the processed text wherein the concept unification token is proximal to personally identifiable information in the processed text; and
   using the configured processor, preventing transmission, beyond the programmable device, of the content of interest identified in the processed text.

2. The method of claim 1, wherein character unification replaces any of a set of similar characters with a single character.

3. The method of claim 2, wherein the set of similar characters are logograms or phonograms.

4. The method of claim 2, wherein the single character is selected from the set of similar characters.

5. The method of claim 1, wherein phrase unification replaces any of a set of similar phrases with a token.

6. The method of claim 1, wherein concept unification replaces any of a set of values with a token.

7. The method of claim 1, wherein the at least one predefined rule includes at least one token.

8. The method of claim 1, wherein the at least one predefined rule includes at least one text pattern matching command sequence.

9. A system for identifying content of interest, the system comprising:
   an interface to a programmable device configured to access a text in a first language for analysis;
   a processor in communication with the interface, the processor configured to:
      apply a plurality of unification processes chained in a series configuration to create a processed text, the plurality of unification processes including at least one character unification that replaces each of at least two distinct characters in the text with a unification character token in the processed text, at least one phrase unification that replaces each of at least two distinct phrases in the text with a single unification phrase token in the processed text, and at least one concept unification, wherein the at least one concept unification replaces a first portion of the text with a concept unification token based on a second portion of the text that is adjacent to the first portion;
      identify a content of interest in the processed text by comparing the processed text including the concept unification token to at least one predefined rule that defines content of interest as a portion of the processed text wherein the concept unification token is proximal to personally identifiable information in the processed text; and
      prevent transmission, beyond the programmable device, of the content of interest identified in the processed text; and
   a data store in communication with the processor, the data store containing the at least one predefined rule.

10. The system of claim 9, wherein character unification replaces any of a set of similar characters with a single character.

11. The system of claim 10, wherein the set of similar characters are logograms or phonograms.

12. The system of claim 10, wherein the single character is selected from the set of similar characters.

13. The system of claim 9, wherein phrase unification replaces any of a set of similar phrases with a token.

14. The system of claim 9, wherein concept unification replaces any of a set of values with a token.

15. The system of claim 9, wherein the at least one predefined rule includes at least one token.

16. The system of claim 9, wherein the at least one predefined rule includes at least one regular expression.

17. The system of claim 9, wherein at least one of the unification character token and the unification phrase token comprises a second language that is distinct from the first language.

18. A non-transitory computer readable medium containing computer-executable instructions for performing a method for identifying content of interest, the non-transitory computer readable medium comprising:
   computer-executable instructions for accessing, through an interface to a programmable device, a text in a first language for analysis;
   computer-executable instructions for applying, using a configured processor, a plurality of unification processes chained in a series configuration to create a processed text, the plurality of unification processes including at least one character unification that replaces each of at least two distinct characters in the text with a unification character token in the processed text, at least one phrase unification that replaces each of at least two distinct phrases in the text with a single unification phrase token in the processed text, and at least one concept unification, wherein the at least one concept unification replaces a first portion of the text with a concept unification token based on a second portion of the text that is adjacent to the first portion;
   computer-executable instructions for identifying a content of interest in the processed text by comparing, using the configured processor, the processed text including the concept unification token to at least one predefined rule that defines content of interest as a portion of the processed text wherein concept unification token is proximal to personally identifiable information in the processed text, the at least one predefined rule further including a regular expression; and computer-executable instructions for preventing transmission, beyond the programmable device, of the content of interest identified in the processed text.

19. The non-transitory computer readable medium of claim 18, wherein at least one of the unification character token and the unification phrase token comprises a second language that is distinct from the first language.

* * * * *